June 2, 1953  S. G. WINGQUIST  2,640,335
UNIVERSAL JOINT

Filed June 23, 1950  2 Sheets-Sheet 1

Inventor:
Sven Gustaf Wingquist,
By: Pierce, Scheffler & Parker,
Attorneys.

June 2, 1953 S. G. WINGQUIST 2,640,335
UNIVERSAL JOINT

Filed June 23, 1950 2 Sheets-Sheet 2

Inventor:
Sven Gustaf Wingquist,
By Pierce, Scheffler & Parker,
Attorneys.

Patented June 2, 1953

2,640,335

UNITED STATES PATENT OFFICE 2,640,335

UNIVERSAL JOINT

Sven Gustaf Wingquist, Gothenburg, Sweden

Application June 23, 1950, Serial No. 169,864
In Sweden August 16, 1949

10 Claims. (Cl. 64—21)

The invention relates to universal joints. One object of the invention is to provide means in such joints for taking up any pressure and pull acting on the joint in an axial direction.

Figure 1:
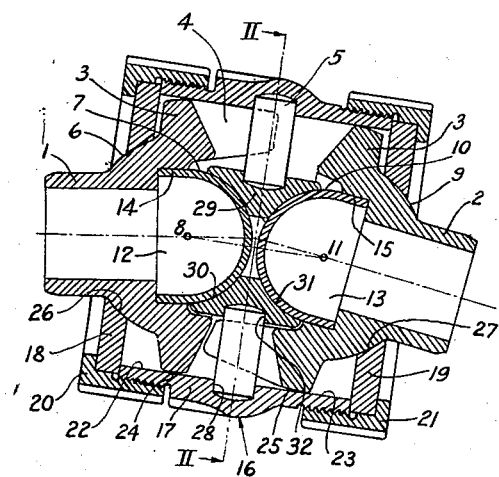
Figure 2:
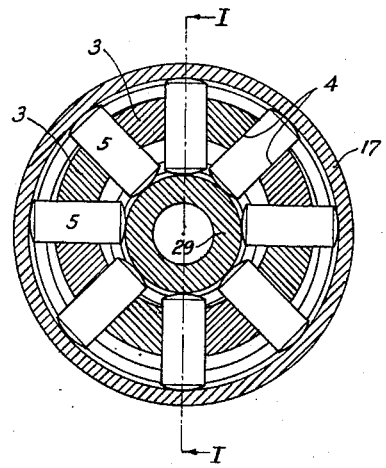
Figure 3:
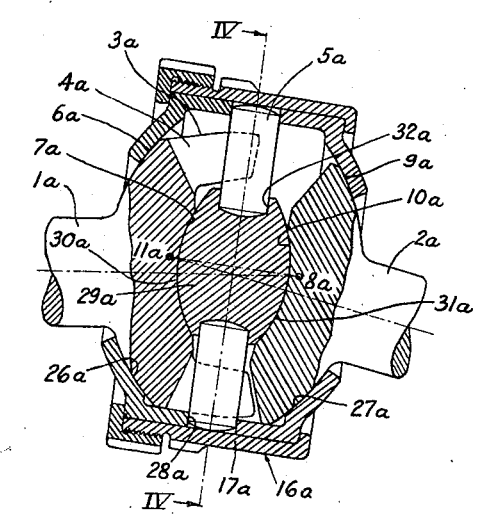

Three embodiments of the invention are described in the following with reference to the accompanying drawings. In these Figs. 1 and 2 show the first, Figs. 3 and 4 the second and Figs. 5 and 6 the third embodiment. Figs. 1, 3 and 5 show axial sections and Figs. 2, 4 and 6 transverse sections as indicated by the section lines. Parts having the same function are in the various modifications denoted by 1, 1a, 1b and so on.

In Figs. 1 and 2 the driving joint member is denoted by 1 and the driven joint member by 2, each having four arms 3. The arms have races 4 between which are disposed rollers 5.

The joint member 1 has an outer spherical surface 6 and an inner spherical surface 7 having a common centre at the point 8 on the axis of the joint member 1. Similarly the joint member 2 has an outer spherical surface 9 and an inner spherical surface 10 having a common centre at the point 11 on the axis of the joint member 2. The two centres 8 and 11 are separate from each other. In this embodiment each point 8, 11 is on the same side of a transverse plane through the centre of the joint (II—II in Fig. 1) as the spherical surfaces 6, 7 and 9, 10 respectively for which they are the centre. The two inner spherical surfaces 7, 10, in the embodiment shown, are formed on members 12, 13 mounted in recesses 14, 15 in the joint members.

The joint members are surrounded by an outer bisecting member 16. The bisecting member comprises a cylindrical member 17 and two end plates 18, 19 which by means of flange nuts 20, 21 are secured to the cylindrical member. The cylindrical member 17 on the inside has cylindrical surfaces 22, 25 by means of which it engages with spherical surfaces 24, 25 on the joint members having their centres at the points 8 and 11 respectively. The end plates have spherical surfaces 26, 27 engaging with the spherical surfaces 6, 9 on the joint members. The rollers 5 are mounted in a grove 28 in the cylindrical member 17.

The member 16 holds the joint members together against pull in the axial direction thereof.

Within the joint is mounted an inner bisecting member 29 having substantially the shape of a double concave lens and having spherical surfaces 30, 31 engaging with the spherical surfaces 7, 10 on the joint members. The rollers 5 are mounted in a groove 32 in the inner bisecting member.

The inner bisecting member takes up pressure acting on the joint in the axial direction thereof.

The rollers 5 are thus mounted both in an outer and in an inner bisecting member. In this way the two bisecting members form a unit which when turning in the plane of the paper in Fig. 1 behaves as a rigid body. If the centres 8 and 11 are symmetrically disposed relatively to the transverse centre plane of the joint (II—II in Fig. 1) then this unit, when the joint members are deflected relatively to each other, will be guided in such manner that the common centre plane of the rollers will always be in the bisecting plane of the joint. When the joint members are deflected relatively to each other the bisecting members are displaced in such manner that their centres no longer coincide with the point of intersection between the axes of the joint members. As the two bisecting members turn about spherical surfaces having common centres 8 and 11 they copy each other's movements, so that when the joint members are deflected relatively to each other the said radial displacement is the same in respect of both and in the same direction. The rollers take part in this radial displacement and therefore, at the same time as they roll against the races, are displaced along the races in the radial direction thereof.

Figure 4:
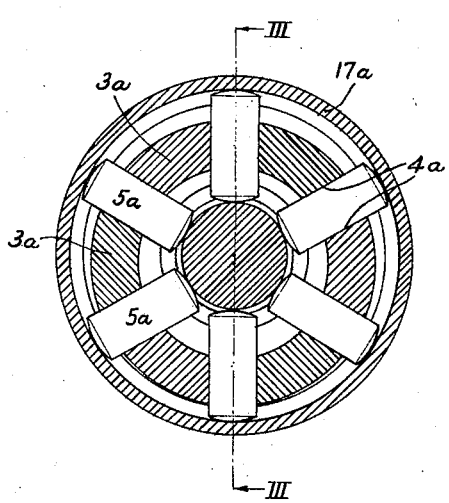
Figure 5:
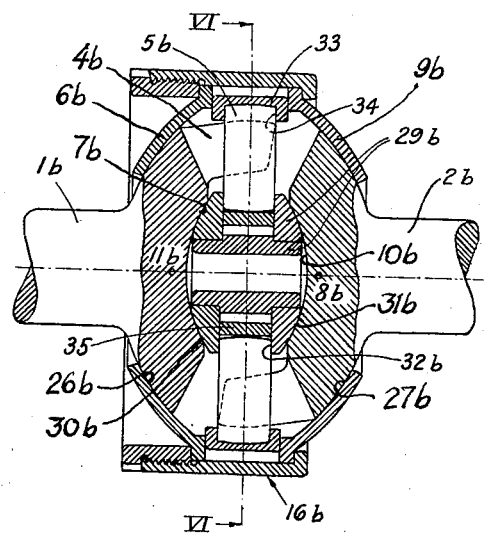

In the embodiment shown in Figs. 3 and 4 the inner bisecting member 29a substantially has the shape of a double convex lens, and the inner spherical surfaces 7a, 10a on the joint members are concave. For each joint member the centres 8a and 11a respectively is on the opposite side of the transverse central plane (IV—IV in Fig. 3) as the appertaining spherical surfaces 6a, 7a and 9a, 10a respectively.

The outer bisecting member 16a is slightly different from that shown in Figs. 1 and 2 but functions in the same way.

Figure 6:
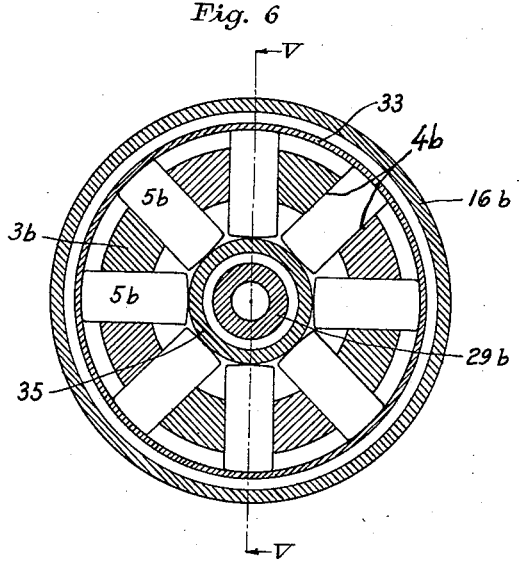

The embodiment shown in Figs. 5 and 6 is similar to that shown in Figs. 3 and 4. Means are, however, provided to prevent displacement of the rollers along the races in the radial direction. In the outer bisecting member 16b is disposed a radially displaceable ring 33, in which the rollers 5b are mounted in a peripheral groove 34. In a peripheral groove 32b in the inner bisecting member 29b is mounted another ring 35 which is also movable in the radial direction and with which the rollers engage with their inner ends. When the joint members are deflected relatively to each other the bisecting members are displaced in the radial direction relatively to the rings 33, 35 so that the rollers roll between the races without displacement in the radial direction. In this case, in order to enable the ring 35 to be inserted, also the inner bisecting member is made in two halves.

Modifications are possible within the scope of the invention. It is not necessary that the spherical surfaces on the joint member 1 have the same radii as on the joint member 2, but it is essential that the centres of the spherical surfaces are symmetrically placed relatively to the transverse central place. The most practical arrangement, however, is to have the radii of the two joint members equal, as then the bisecting members become symmetrical in respect of the spherical surfaces and may be turned one way or the other when the joint is put together. The various details may of course be combined with each other in various ways without it being considered necessary to describe these possibilities in detail. Instead of the spherical surfaces (for example 26, 27 in Figs. 1 and 2) it is possible to use for example conical surfaces or other surfaces providing only a line of contact.

What I claim is:

1. Universal joint comprising in combination a driving joint member, a driven joint member, arms on the joint members, races on the arms, rolling members between the races, an outer convex surface and an inner spherical surface on the driving joint member having a common centre on the axis of said driving joint member, an outer convex and an inner spherical surface on the driven joint member having a common centre on the axis of said driven joint member separate from the corresponding centre for the driving joint member, an outer bisecting member surrounding the joint members, inner surfaces on the outer bisecting member by means of which it is mounted on the outer convex surfaces of the joint members, an inner substantially lenticular bisecting member mounted within the joint, and outer spherical surfaces on the inner bisecting member complementary to and seated against said inner spherical surfaces on the joint members, said rolling members being arranged between and journalled on the outer and inner bisecting members.

2. Universal joint as claimed in claim 1 in which the inner bisecting member substantially has the shape of a double concave lens.

3. Universal joint as claimed in claim 1 in which the inner bisecting member substantially has the shape of a double convex lens.

4. Universal joint as claimed in claim 1 in which the said centres are symmetrically arranged on each side of and in relation to the transverse central plane of the joint.

5. Universal joint as claimed in claim 1 in which the outer convex surface on the driving joint member has the same radius as the outer convex surface on the driven joint member and the inner spherical surface on the driving joint member has the same radius as the inner spherical surface on the driven joint member.

6. Universal joint as claimed in claim 1 in which said rolling members are rollers and peripheral grooves are provided in the outer and inner bisecting members in which the rollers are mounted with their outer and inner ends respectively.

7. Universal joint as claimed in claim 1 in which said rolling members are rollers, and comprising in addition a member displaceable in the outer bisecting member in the radial direction in which the rollers are mounted with their outer ends, and a member displaceable in the inner bisecting member in the radial direction in which the rollers are mounted with their inner ends.

8. Universal joint as claimed in claim 7 in which an inner peripheral groove is provided in the member movable in the outer bisecting member in which the rollers are mounted with their outer ends, and the inner bisecting member and the member movably mounted therein form a groove in which the rollers are mounted with their inner ends.

9. Universal joint as claimed in claim 1 in which the inner bisecting member substantially has the shape of a double convex lens, the said centres are symmetrically arranged on each side of and in relation to the transverse central plane of the joint, the outer convex surface on the driving joint member has the same radius as the outer convex surface on the driven joint member, the inner spherical surface on the driving joint member has the same radius as the inner spherical surface on the driven joint member, and peripheral grooves are provided in the outer and the inner bisecting members in which the rollers are mounted with their outer and inner ends respectively.

10. Universal joint as claimed in claim 1 in which the inner bisecting member substantially has the shape of a double convex lens, the said centres are symmetrically arranged on each side of and in relation to the transverse central plane of the joint, the outer convex surface on the driving joint member has the same radius as the outer convex surface on the driven joint member, the inner spherical surface on the driving joint member has the same radius as the inner spherical surface on the driven joint member, an annular member is mounted in the outer spherical bisecting member so as to be displaceable therein in the radial direction, said annular member having an inner peripheral groove in which the rollers are mounted with their outer ends, and an annular member is mounted in the inner bisecting member so as to be displacable therein in the radial direction, said annular member with the inner bisecting member forming a peripheral groove in which the rollers are mounted with their inner ends.

SVEN GUSTAF WINGQUIST.

References Cited in the file of this patent

UNITED STATES PATENTS

| Number | Name | Date |
|---|---|---|
| 2,051,248 | Dunn | Aug. 18, 1936 |
| 2,286,182 | Amberg | June 16, 1942 |

FOREIGN PATENTS

| Number | Country | Date |
|---|---|---|
| 566,301 | Great Britain | 1944 |